United States Patent
Little et al.

(10) Patent No.: US 9,677,421 B2
(45) Date of Patent: Jun. 13, 2017

(54) GAS TURBINE ENGINE ROTOR DRAIN FEATURE

(71) Applicant: United Technologies Corporation, Hartford, CT (US)

(72) Inventors: Jonathan D. Little, West Hartford, CT (US); Herbert L. Walker, Bloomfield, CT (US); Arun Jayasingh, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 808 days.

(21) Appl. No.: 13/658,876

(22) Filed: Oct. 24, 2012

(65) Prior Publication Data

US 2014/0147249 A1    May 29, 2014

(51) Int. Cl.
| | | |
|---|---|---|
| *F01D 25/18* | (2006.01) | |
| *F01D 5/06* | (2006.01) | |
| *F01D 25/32* | (2006.01) | |
| *F02C 7/06* | (2006.01) | |

(52) U.S. Cl.
CPC .............. *F01D 25/18* (2013.01); *F01D 5/06* (2013.01); *F01D 25/32* (2013.01); *F02C 7/06* (2013.01)

(58) Field of Classification Search
CPC . F01D 5/027; F01D 5/06; F01D 25/32; F01D 25/18; F05D 2240/61; F05D 2240/63; F05D 2260/602; F05D 2260/6022; F05D 2260/608; F02C 7/06

See application file for complete search history.

(56) References Cited

U.S. PATENT DOCUMENTS

| | | | |
|---|---|---|---|
| 2,623,728 A | 12/1952 | Feilden et al. | |
| 2,827,342 A | 3/1958 | Roach | |
| 2,892,583 A | 6/1959 | Clarke | |
| 3,428,243 A | 2/1969 | Britt et al. | |
| 3,528,241 A * | 9/1970 | Gill, Jr. ................. | F01D 25/18 184/6 |
| 3,647,313 A * | 3/1972 | Koff .............................. | 415/115 |
| 3,844,110 A | 10/1974 | Widlansky et al. | |
| 3,903,690 A | 9/1975 | Jones | |
| 3,912,418 A | 10/1975 | Andrews et al. | |
| 3,925,979 A * | 12/1975 | Ziegler .................. | F02C 7/047 244/134 R |

(Continued)

FOREIGN PATENT DOCUMENTS

| | | |
|---|---|---|
| DE | 2844701 A1 | 4/1979 |
| EP | 0475771 A1 | 3/1992 |
| EP | 1209320 A2 | 5/2002 |

OTHER PUBLICATIONS

International Searching Authority, PCT Notification of Transmittal of the International Search Report and the Written Opinion, Jan. 24, 2014, 10 pages.

(Continued)

*Primary Examiner* — Dwayne J White
*Assistant Examiner* — Adam W Brown
(74) *Attorney, Agent, or Firm* — Kinney & Lange, P.A.

(57) ABSTRACT

An assembly for a gas turbine engine includes a rotor formed by a drum and a hub. The drum has a generally conically shaped inner surface that defines a flow path along a first cavity. The hub is connected to the drum and has a conically shaped inner surface that defines a flow path along a second cavity.

20 Claims, 3 Drawing Sheets

(56) References Cited

U.S. PATENT DOCUMENTS

| | | | |
|---|---|---|---|
| 3,935,704 | A | 2/1976 | Barnes |
| 4,190,398 | A | 2/1980 | Corsmeier et al. |
| 4,230,436 | A | 10/1980 | Davison |
| 4,309,145 | A | 1/1982 | Viola |
| 4,469,470 | A | 9/1984 | Geary |
| 4,500,143 | A | 2/1985 | Kervistin et al. |
| 4,693,672 | A | 9/1987 | Carvalho |
| 4,824,327 | A | 4/1989 | Titterton, III |
| 4,844,694 | A * | 7/1989 | Naudet ................ F16B 35/041 415/199.5 |
| 5,307,623 | A | 5/1994 | Antuna et al. |
| 6,312,221 | B1 | 11/2001 | Yetka et al. |
| 7,296,398 | B2 * | 11/2007 | Moniz et al. ................... 60/268 |
| 2006/0251512 | A1 | 11/2006 | Singh et al. |
| 2008/0107522 | A1 | 5/2008 | DiBenedetto |
| 2009/0136356 | A1 * | 5/2009 | Beckford et al. ............. 416/239 |

OTHER PUBLICATIONS

Extended European Search Report fro EP Application No. 13849562.7, dated Jul. 6, 2016, 6 pages.

* cited by examiner

GAS TURBINE ENGINE ROTOR DRAIN FEATURE

BACKGROUND

The invention relates to gas turbine engines, and more particularly to rotors for gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Gas turbine engines require substantial amounts of high pressure oil to lubricate the rotor bearings. During some transient operations, and in particular during start-up, clearances exist which permit leakage of the oil into the interior of the rotor assembly. If the oil remains trapped within the rotor, rotor unbalance and the increased potential for fire can result. Rotor unbalance has been shown to lead to destructive vibration, which significantly reduces the serviceable life of the rotor.

In some gas turbine engines, a hub connects a forward disk to a shaft. The hub and disk are highly loaded with dynamic torque and radial and axial loads. To avoid rotor unbalance, some provision for drainage of leakage oil from the hub and disk must be made or the oil will become trapped. Prior designs have placed small drainage holes through the hub and/or disk. However, the use of these holes in the highly stressed hub and disk creates stress concentrations and decreases the low cycle fatigue life of these parts.

SUMMARY

An assembly for a gas turbine engine includes a drum and a hub. The drum has a generally conically shaped inner surface that defines a flow path along a first cavity. The hub is connected to the drum and has a conically shaped inner surface that defines a flow path along a second cavity.

A kit for a gas turbine engine includes a hub and a drum. The drum is adapted to be mounted to the hub. The hub comprises a solid piece with no drainage holes therein and the drum comprises a solid piece with no drainage holes therein.

A gas turbine engine includes a drum and a hub. The drum supports several stages of blades and has a generally conically shaped inner surface that defines a flow path for a first fluid along a first cavity. Additionally, the drum comprises a solid piece with no drainage holes therein. The hub is connected to the drum to allow for co-rotation of the hub and drum, and the hub has a generally conically shaped inner surface that defines a flow path for a second fluid along a second cavity. Additionally, the hub comprises a solid piece with no drainage holes therein.

DETAILED DESCRIPTION

The present invention provides a solid hub body and a solid drum body each with no drainage holes, channels, or depressions therein where fluids such as leakage oil can collect during operation. Additionally, the hub and drum are generally conically shaped extending both axially as well as radially with respect to the engine centerline axis so as to facilitate the flow of leakage oil out of cavities within the gas turbine engine to the engine flow path. These features help to reduce the likelihood of rotor unbalance and potential for fire within the engine. Additionally, the features reduce the likelihood of rotor unbalance without utilizing drainage holes that can cause stress concentrations and decrease the low cycle fatigue life of rotor.

Figure 1:
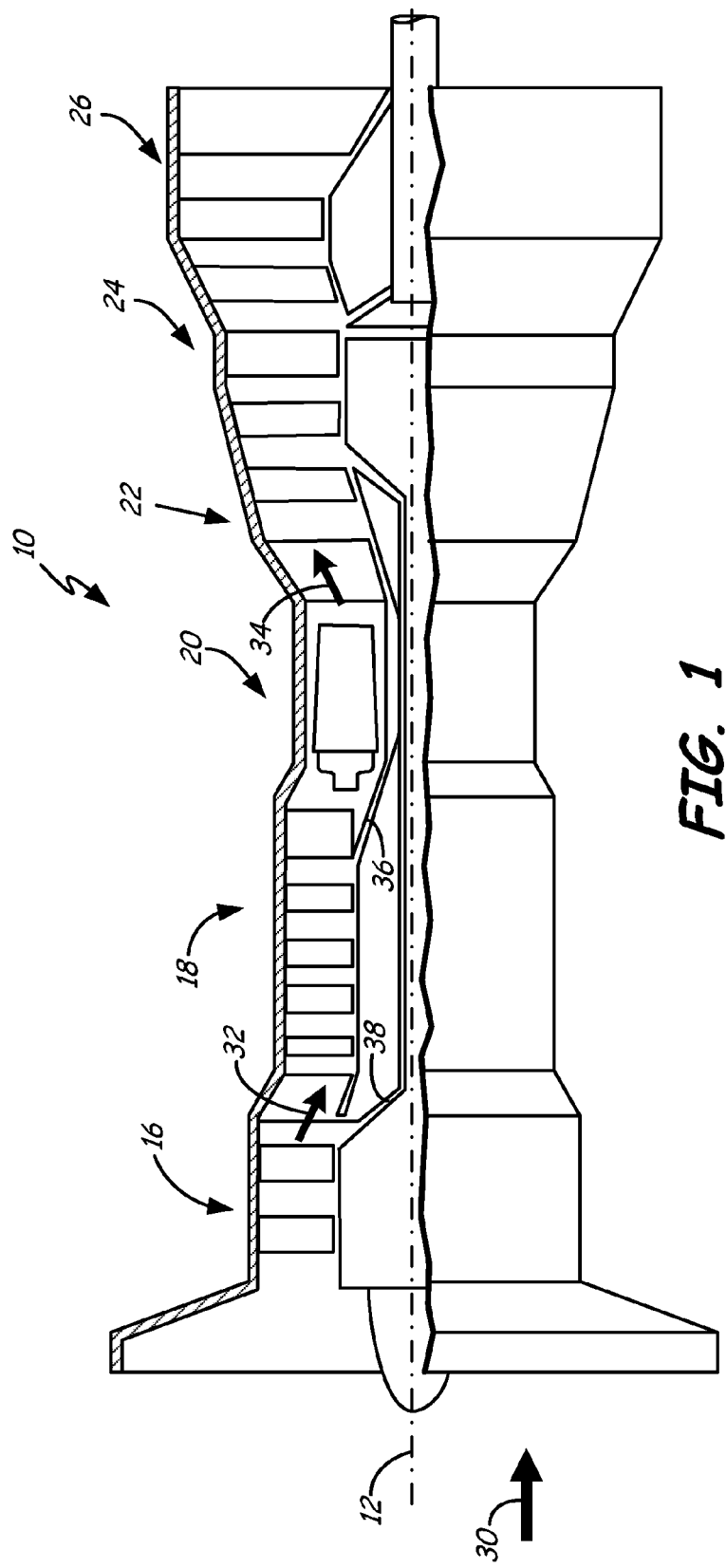
FIG. 1 is a partial cross-sectional view of an exemplary gas turbine engine.

An exemplary industrial gas turbine engine 10 is circumferentially disposed about a central, longitudinal axis or axial engine centerline axis 12 as illustrated in FIG. 1. The engine includes in series order from front to rear, low and high pressure compressor section 16 and 18, a central combustor section 20 and high and low pressure turbine sections 22 and 24. In some examples, a free turbine section is disposed aft of the low pressure turbine 24. The free turbine section may, for example, drive an electrical generator, pump, or gearbox (not shown). Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in the compressors 16 and 18. Fuel mixes with the pressurized air 32 in the combustor section 20, where it is burned. Once burned, combustion gases 34 expand through turbine sections 22 and 24. Turbine sections 22 and 24 drive high and low pressure rotor shafts 36 and 38 respectively, which rotate in response to the combustion products.

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications.

Figure 2:
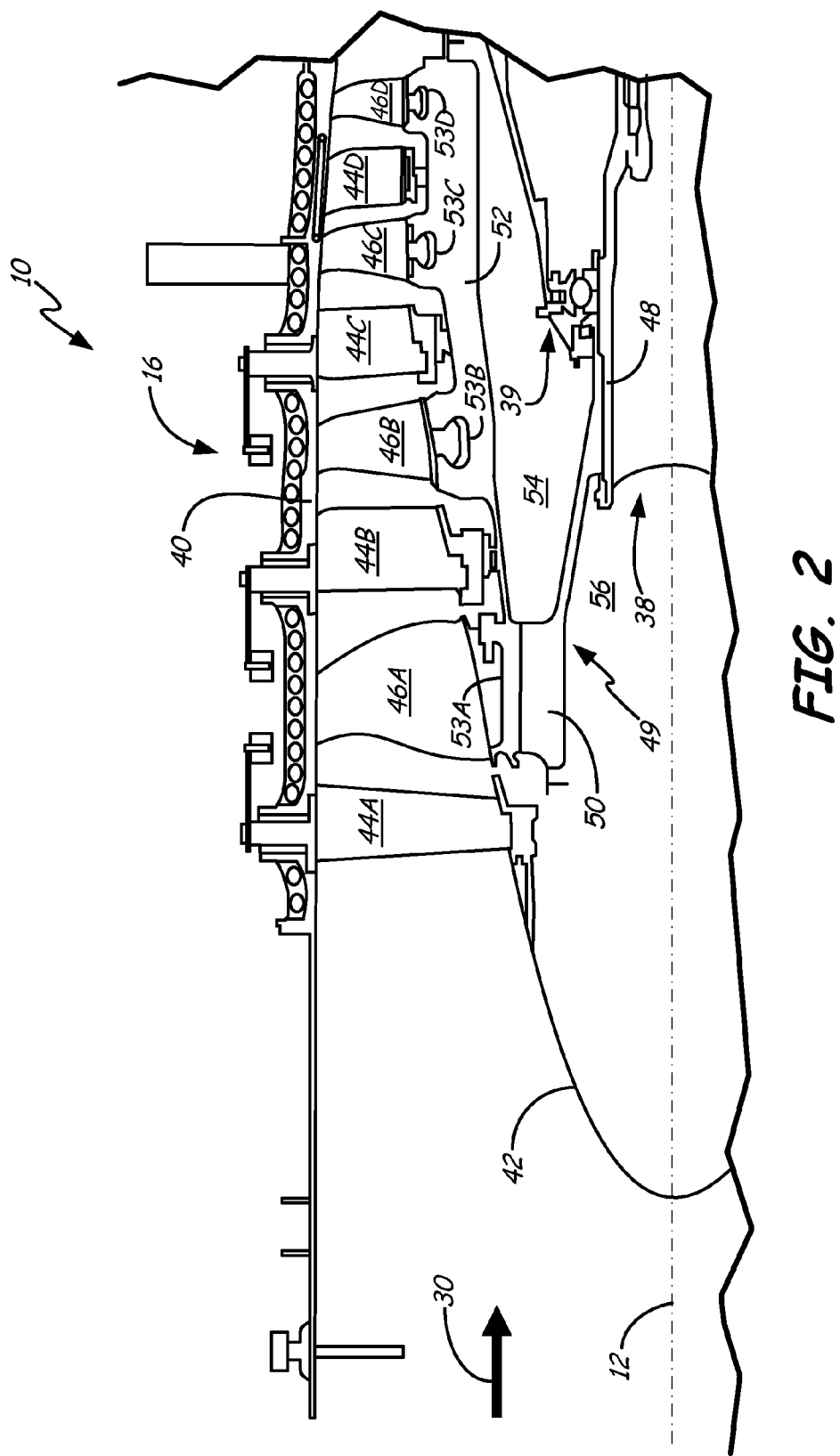
FIG. 2 is an enlarged sectional view of a low pressure section of the gas turbine engine of FIG. 1.

FIG. 2 provides an enlarged view of a forward portion of low pressure compressor section 16 and low pressure rotor shaft 38 above engine centerline axis 12. In addition to low pressure compressor section 16 and low pressure rotor shaft 38, gas turbine engine 10 includes a bearing 39, an engine case 40, and a nose cone 42. Low pressure compressor section 16 includes vane stages 44A, 44B, 44C, and 44D, rotor blade stages 46A, 46B, 46C, and 46D, a stub shaft 48, a rotor 49 (formed by a hub 50 and a drum 52), a first cavity 54, and a second cavity 56.

Low pressure rotor shaft 38 is mounted to and supported by bearing 39 within engine case 40. Stator engine case 40 extends annularly around components of low pressure compressor section 16 including nose cone 42. Together nose cone 42 and engine case 40 define an engine flow path for incoming ambient air 30.

A plurality of vane stages 44A, 44B, 44C, and 44D are spaced axially from one another along engine centerline axis 12 and are mounted to engine case 40. Stator vane stages 44A, 44B, 44C, and 44D, which include a plurality of vanes, extend in a circumferential direction about engine center line axis 12. In the embodiment shown in FIG. 2, vane stages 44A, 44B and 44C comprise variable vane stages, which can be pivoted to change the position of the vane relative to the direction of air flow through the engine flow path.

Similarly, a plurality of rotor blade stages 46A, 46B, 46C, and 46D are spaced axially from one another along engine centerline axis 12 and are mounted to hub 50 and drum 52 of rotor 49. Rotor blade stages 46A, 46B, 46C, and 46D are disposed between vane stages 44A, 44B, 44C, and 44D. Rotor blade stages 46A, 46B, 46C, and 46D, which include a plurality of blades, extend in a circumferential direction about engine center line axis 12.

In the embodiment shown in FIG. 2, low pressure rotor shaft 38 comprises stub shaft 48. Hub 50 is mounted to and extends axially forward as well as radially outward from stub shaft 48. A forward and outward portion of hub 50 has a slot 53A for receiving root portions of the rotor blades of blade stage 46A.

Hub 50 is connected to a forward end of drum 52, which extends axially rearward as well as radially therefrom. Drum 52 is configured with slots 53B-53D that receive the root portions of rotor blades of blade stages 46B, 46C, and 46D, respectively. Drum 52 can additionally include features such as knife edges which form seals between rotating drum 52 and stator vane stages 44B, 44C, and 44D.

First cavity 54 is disposed between and is formed by hub 50 and drum 52. First cavity 54 additionally is bounded by bearing 39. First cavity 54 extends aftward adjacent drum 52 and communicates with the engine flow path. Second cavity 56 is separated from first cavity 54 by hub 50. Second cavity 56 is bounded by stub shaft 48 as well as hub 50. Second cavity 56 becomes progressively larger in diameter extending away from stub shaft 48 toward the forward extent of hub 50.

Figure 3:
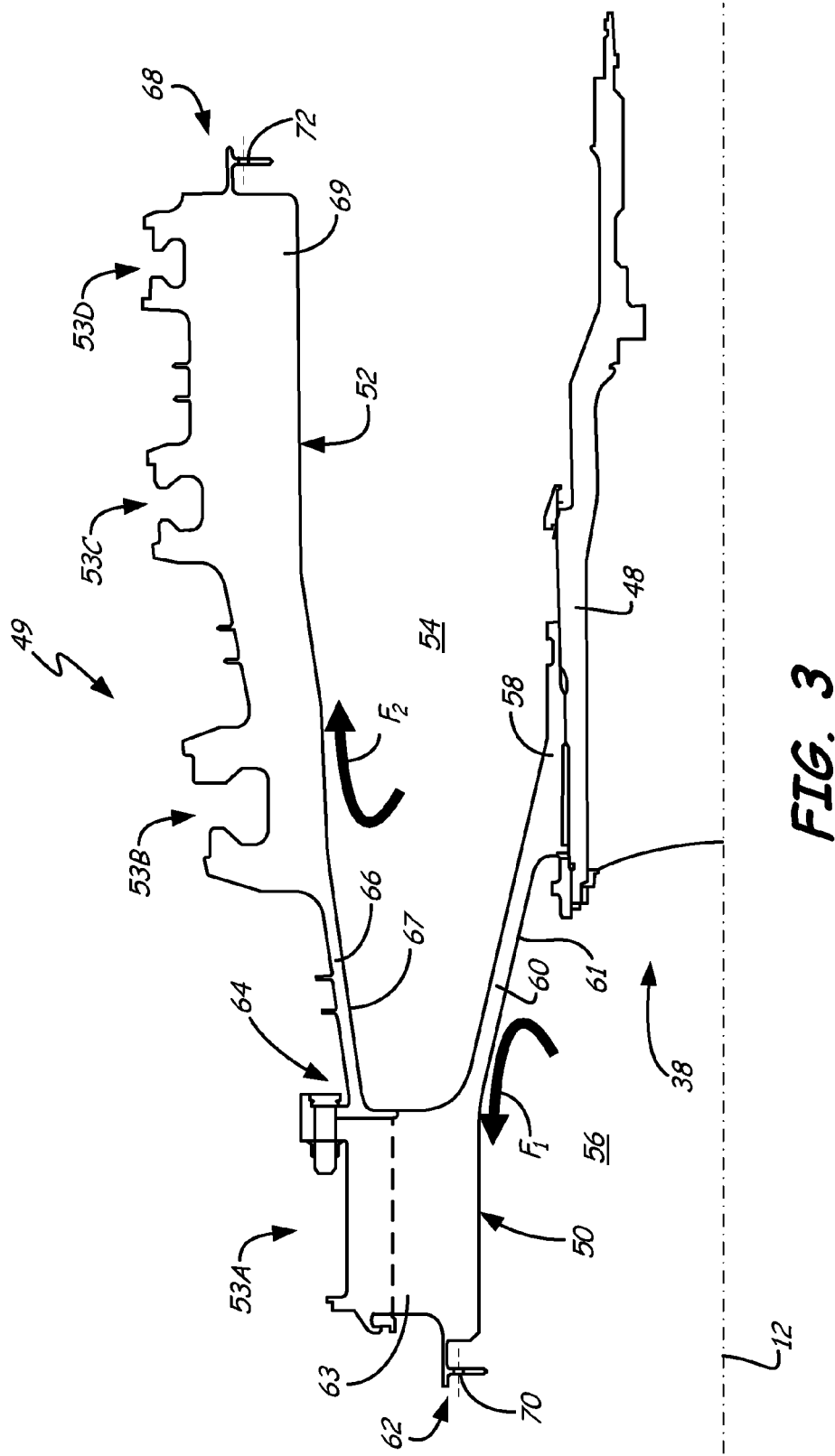
FIG. 3 is a sectional view showing one embodiment of a shaft, a hub, and a drum.

FIG. 3 shows stub shaft 48, hub 50, drum 52, first cavity 54, and second cavity 56 with other components of gas turbine engine 10 (FIGS. 1 and 2) removed. Hub 50 includes a shaft connection region 58, necked region 60, inner surface 61, flange 62, and body 63. Drum 52 includes a connection region 64, a necked region 66, an inner surface 67, a flange 68, and main body 69. Bodies 63 and 69 of hub 50 and drum 52, respectively, are solid. Flange 62 includes one or more holes 70. Flange 68 includes one or more holes 72.

Connection region 58 interfaces with and is mounted to stub shaft 48 by a spline and nut connection or other known means. Necked region 60 is connected to connection region 58. Necked region 60 extends generally axially forward as well as radially outward from stub shaft 48 and engine centerline axis 12 to connect with body 63. Necked region 60 and body 63 comprise solid parts with no drainage holes therein. Due to the configuration of necked region 60 and body 63, inner surface 61 of hub 50 has a smooth generally conical shape. Inner surface 61 has no channels, depressions, or holes therein where fluid such as oil or water could pool during operation causing rotor imbalance.

Body 63 extends axially forward to flange 62. Flange 62 extends from body 63 and provides for rotor balancing and assembly of hub 50. One or more holes 70 can be formed in flange 62 and extend in a generally axial direction therethrough. One or more holes 70 allow for passage of fluids therethrough during operation.

Body 63 extends radially outward from centerline axis 12 and interfaces with connection region 64 at the forward end of drum 52 along an outer radial portion of hub 50. In the embodiment shown, connection region 64 is received in a channel that extends along an outer aft portion of body 63. Connection region 64 is connected to body 63 by fasteners.

Necked region 66 of drum 52 connects to and extends generally axially rearward as well as radially outward from body 63 and connection region 64 to connect with body 69 of drum 52. Necked region 66 and body 69 comprise solid parts with no drainage holes therein. Due to the configuration of necked region 66 and body 69, inner surface 67 of drum 52 has a smooth generally conical shape. Inner surface 67 has no channels, depressions, or drainage holes therein where fluid such as oil or water could pool during operation to cause rotor imbalance.

Body 69 extends axially rearward to flange 68. Flange 68 extends from body 69 and provides for rotor balancing and assembly of drum 52. One or more holes 72 can be formed in flange 68 and extend in a generally axial direction therethrough. One or more holes 72 allow for passage of fluids therethrough during operation.

In operation, fluids $F_1$ and $F_2$ such as oil (from, for example, bearing 39 (FIG. 2)), water, etc., can enter first cavity 54 and second cavity 56. Centrifugal forces that result from the rotation of the rotor will cause the fluid $F_1$ and $F_2$ to move radially outward to the radial outer edges of first cavity 54 and/or second cavity 56 as illustrated in FIG. 3.

In first cavity 54, the fluid $F_2$ moves radially outward and travels rearward along the smooth generally conical inner surface 67 of drum 52. Thus, inner surface 67 defines a flow path for the fluid $F_2$ along first cavity 54. The fluid $F_2$ travels generally aft and radially outward along inner surface 67 and passes flange 68 to enter the main engine flow path aft of rotor blade stage 46D (FIG. 2) where it is eventually evaporated.

In second cavity 56, fluid $F_1$ moves radially outward and travels forward along the smooth generally conical inner surface 61 of hub 50. Thus, inner surface 61 defines a flow path for the fluid $F_1$ along second cavity 56. Fluid $F_1$ travels generally forward and radially outward along inner surface 61 and passes flange 62 to enter the flow path forward of stator vane stage 44A (FIG. 2) where it is eventually evaporated.

The present invention provides a rotor formed by a solid hub and a solid drum, each with no drainage holes, channels, or depressions therein where fluids such as leakage oil can collect during operation. Additionally, the hub and drum are generally conically shaped extending both axially as well as radially with respect to the engine centerline axis so as to facilitate the flow of leakage oil out of cavities within the gas turbine engine to the engine flow path. These features help to reduce the likelihood of rotor unbalance and potential for fire within the engine. Additionally, the features reduce the likelihood of rotor unbalance without utilizing drainage holes that can cause stress concentrations and decrease the low cycle fatigue life of rotor.

Discussion of Possible Embodiments

The following are non-exclusive descriptions of possible embodiments of the present invention.

An assembly for a gas turbine engine includes a drum and a hub. The drum has a generally conically shaped inner surface that defines a flow path along a first cavity. The hub is connected to the drum and has a conically shaped inner surface that defines a flow path along a second cavity.

The assembly of the preceding paragraph can optionally include, additionally and/or alternatively, any one or more of the following features, configurations and/or additional components.

The second cavity is formed by the hub and a shaft.

The hub is mounted to the shaft and extends generally axially forward as well as radially outward from the shaft and a centerline axis of the gas turbine engine.

The drum extends generally axially rearward as well as radially outward from the hub and a centerline axis of the gas turbine engine.

A necked region of the hub separates the first cavity from the second cavity.

The first cavity is formed by the drum and the hub.

At least one of the hub and the drum include a flange with one or more holes therein to allow for the passage of fluid.

The hub and the drum each comprise solid pieces with no drainage holes therein.

A rotor for a gas turbine engine includes a hub and a drum. The drum is adapted to be mounted to the hub. The hub comprises a solid piece with no drainage holes therein and the drum comprises a solid piece with no drainage holes therein.

The rotor of the preceding paragraph can optionally include, additionally and/or alternatively, any one or more of the following features, configurations and/or additional components.

The drum has a conically shaped surface that defines a flow path for a first fluid.

The hub has a conically shaped surface that defines a flow path for a second fluid.

The hub is disposed to separate a first cavity from a second cavity when the hub and drum are mounted within the gas turbine engine.

The first cavity is formed by the drum and the hub.

At least one of the hub and the drum include a flange with one or more holes therein to allow for the passage of a fluid.

The drum has a plurality of connection slots for receiving root portions of rotor blades forming a plurality of rotor blade stages.

The hub has a connection slot for receiving root portions of rotor blades forming a rotor blade stage located forward of the rotor blade stages connected to the drum.

The drum extends generally axially rearward as well as radially outward from the hub and a centerline axis of the gas turbine engine.

A gas turbine engine includes a shaft, a rotor comprising a drum and a hub, a stage of rotor blades mounted to the hub and a plurality of stages of rotor blades connected to the drum. The hub is mounted to the shaft and extends forward and outward to the drum to allow for co-rotation of the hub and drum, and define a generally conically shaped inner surface. The hub comprises a solid piece with no drainage holes therein. The drum has a forward end attached to the hub and extends rearward and outward from the hub to define a generally conically shaped inner surface. The drum comprises a solid piece with no drainage holes therein.

The gas turbine engine of the preceding paragraph can optionally include, additionally and/or alternatively, any one or more of the following features, configurations and/or additional components.

The first cavity is formed by the hub and a shaft, and the second cavity is formed by the hub and the drum.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine, the assembly comprising:
   a drum having a generally conically-shaped inner surface that defines a flow path for a first leakage fluid and including a first flange extending radially outward with respect to an engine centerline axis;
   a hub connected to a forward portion of the drum to allow for co-rotation of the hub and drum, wherein the hub has a generally conically-shaped inner surface that defines a flow path for a second leakage fluid and including a second flange connected to the first flange; and
   a shaft extending axially rearward from the hub and located radially inward of the drum;
   wherein the drum includes a third flange having one or more holes therein to allow for the passage of the first leakage fluid and wherein at least one of the drum and the hub includes a slot configured to receive a root portion of a rotor blade.

2. The assembly of claim 1, wherein a first cavity is formed when the drum is mounted to the shaft, and wherein a second cavity is formed when the hub is mounted to the shaft.

3. The assembly of claim 2, wherein the hub is mounted to the shaft and extends generally axially forward as well as radially outward from the shaft and a centerline axis of the gas turbine engine.

4. The assembly of claim 2, wherein the drum extends generally axially rearward as well as radially outward from the hub and a centerline axis of the gas turbine engine.

5. The assembly of claim 2, wherein a necked region of the hub separates the first cavity from the second cavity.

6. The assembly of claim 2, wherein the one or more holes in the third flange allow for the passage of the first leakage fluid from the first cavity into an air flow path of the gas turbine engine.

7. The assembly of claim 1, wherein the hub has a body portion and the drum has a body portion, wherein the body portion of the hub and the body portion of the drum are solid pieces with no drainage holes therein.

8. The assembly of claim 1, wherein the generally conically-shaped inner surface of the drum generally increases in diameter in an aft direction and defines a flow path in the aft direction for the first leakage fluid, and wherein the generally conically-shaped inner surface of the hub generally increases in diameter in a forward direction and defines a flow path in the forward direction for the second leakage fluid.

9. A rotor for use in a gas turbine engine, the rotor comprising:
   a hub that comprises a hub body, the hub body being a solid piece with no drainage holes therein and including a first flange extending radially outward with respect to an engine centerline axis;
   a drum with a forward portion adapted for mounting to the hub, wherein the drum comprises a drum body, the drum body being a solid piece with no drainage holes therein and including a second flange connected to the first flange; and
   a shaft extending axially rearward from the hub and located radially inward of the drum;
   wherein at least one of the hub and the drum includes a third flange, the third flange having one or more holes therein to allow for the passage of fluid into an air flow path of the gas turbine engine and wherein at least one of the drum and the hub includes a slot configured to receive a root portion of a rotor blade.

10. The rotor of claim 9, wherein the drum has a conically-shaped surface that defines a flow path for a first fluid.

11. The rotor of claim 10, wherein the hub has a conically-shaped surface that defines a flow path for a second fluid.

12. The rotor of claim 11, wherein a necked region of the hub separates a first cavity from a second cavity when the hub and drum are mounted within the gas turbine engine, the first cavity comprising the first fluid and the second cavity comprising the second fluid.

13. The rotor of claim 12, wherein the flow path of the drum directs the first fluid towards the one or more holes of the third flange.

14. The rotor of claim 12, wherein the flow path of the hub directs the second fluid towards the one or more holes of the third flange.

15. An assembly for a gas turbine engine, the assembly comprising:
 a drum having a generally conically-shaped inner surface that defines a flow path for a first leakage fluid and including a first flange extending radially outward with respect to an engine centerline axis;
 a hub connected to a forward portion of the drum to allow for co-rotation of the hub and drum, wherein the hub has a generally conically-shaped inner surface that defines a flow path for a second leakage fluid and including a second flange connected to the first flange; and
 wherein the hub includes a third flange having one or more holes therein to allow for the passage of the second leakage fluid and wherein at least one of the drum and the hub includes a slot configured to receive a root portion of a rotor blade.

16. The assembly of claim 15, further comprising a shaft, a first cavity that is formed when the drum is mounted to the shaft, and a second cavity that is formed when the hub is mounted to the shaft.

17. The assembly of claim 16, wherein the hub is mounted to the shaft and extends generally axially forward as well as radially outward from the shaft and a centerline axis of the gas turbine engine.

18. The assembly of claim 16, wherein the drum extends generally axially rearward as well as radially outward from the hub and a centerline axis of the gas turbine engine.

19. The assembly of claim 16, wherein the one or more holes in the third flange allow for the passage of the second leakage fluid from the second cavity into an air flow path of the gas turbine engine.

20. The assembly of claim 15, wherein the hub has a body portion and the drum has a body portion, wherein the body portion of the hub and the body portion of the drum are solid pieces with no drainage holes therein.

* * * * *